United States Patent [19]

Peinemann et al.

[11] Patent Number: 4,746,333
[45] Date of Patent: May 24, 1988

[54] METHOD FOR PRODUCING AN INTEGRAL ASYMMETRIC GAS SEPARATING MEMBRANE AND THE RESULTANT MEMBRANE

[75] Inventors: Klaus V. Peinemann, Lauenburg; Ingo Pinnau, Hamburg, both of Fed. Rep. of Germany

[73] Assignee: Kernforschungszentrum Karlsruhe GmbH, Karlsruhe, Fed. Rep. of Germany

[21] Appl. No.: 885,833

[22] Filed: Jul. 15, 1986

[30] Foreign Application Priority Data

Jul. 15, 1985 [DE] Fed. Rep. of Germany ....... 3525235

[51] Int. Cl.⁴ .................... B01D 53/22; B01D 13/04; C08J 9/28
[52] U.S. Cl. .......................................... 55/158; 55/16; 55/68; 264/41
[58] Field of Search .................. 264/41; 210/500.41; 55/16, 68, 158

[56] References Cited

U.S. PATENT DOCUMENTS 4,026,977  5/1977  Bourganel ............ 210/500.41 X
4,673,418  6/1987  Peinemann et al. ............ 55/16 X

FOREIGN PATENT DOCUMENTS 3525235 11/1986 Fed. Rep. of Germany .

OTHER PUBLICATIONS

C. Glen Wensley et al., "High Performance Gas Separation Membranes", American Institute of Chemical Engineers, 1984 Winter National Meeting (1984).
R. T. Chern, *Material Science of Synthetic Membranes*, ACS Symposium Series, vol. 269, pp. 25–46 (American Chemical Society 1985).

Primary Examiner—Philip Anderson
Attorney, Agent, or Firm—Spencer & Frank

[57] ABSTRACT

A method of manufacturing an integral asymmetric membrane for separating gases from each other, wherewith a membrane-former, a solvent, and/or an agent which is not a solvent for the membrane-former are mixed, are spread out or otherwise extended over a greater area, and are contacted with a precipitation agent. The integral asymmetric membrane for gas separation is particularly suitable for $CO_2/CH_4$ separation, has improved insensitivity to water and relatively high strength and durability, and has high separation throughput and selectivity (permeability of $\geq =0.1$ cu m/sq m/hr/bar for $CO_2$, and $CO_2/CH_4$ selectivity of about 30–40), which high separation throughput and selectivity are necessary for economical separation of materials. The integral asymmetric membrane is made from a polymer, particularly polyether sulfone, as a membrane-former, is mixed with a halogenated hydrocarbon, as a solvent, as well as with a non-solvent in the form of an aliphatic alcohol, which non-solvent may possibly comprise, in addition to the aliphatic alcohol, an aliphatic carboxylic acid or an alkylbenzene.

20 Claims, 1 Drawing Sheet

METHOD FOR PRODUCING AN INTEGRAL ASYMMETRIC GAS SEPARATING MEMBRANE AND THE RESULTANT MEMBRANE

BACKGROUND OF THE INVENTION

1. Field of the Invention

The invention relates to a method of manufacturing and of increasing the selectivity of an integral asymmetric membrane for separating gases from each other.

2. Technology Review

Membrane processes can be operated with low energy consumption in comparison to conventional gas separation methods such as low temperature distillation, and chemical and physical absorption. Generally, the process of separating a gas mixture is carried out isothermally, i.e. without phase change. Membrane processes are distinguished by high process flexibility, simple operation, and low maintenance costs.

The chief cost factor in a membrane process is the choice of a suitable membrane material, in addition to the employment of suitable modular systems and appropriate process operation and control. An "ideal" membrane for gas separation should have the following properties:

1. Very high selectivities with regard to various separation tasks (e.g., $He/N_2$, $H_2/N_2$, $CO_2/CH_4$, and other separations).
2. Highly permeable gas flow (flux) (e.g., He, $H_2$, and $CO_2$).
3. Minimum plastification (i.e., becoming plastic) of the membrane.
4. High heat stability.
5. High mechanical strength.
6. High chemical resistance, particularly against "impurities" in a natural gas mixture (water vapor and $H_2S$ in biogases and geogases).
7. Good reproducibility of membrane manufacture.
8. Manufacturable by simple, easy, and maximally economical method.

For a long time there has been a lack of success in manufacturing an "ideal" membrane, because some of the requirements are in mutual opposition. In general, highly permeable membranes (e.g., silicones) are not very selective, and highly selective membranes, typically glass-like polymers, are not very permeable.

In order to be able to compete with commercially available membranes, a newly developed membrane must have a selectivity of $\alpha_j = 20$. Moreover, for economical application of membranes to gas separation, a selectivity of $\alpha_j \geq 40$ should be attained, with correspondingly high permeabilities to rapidly permeating components (see Wensley, G. C., Jakabhazy, S. Z., "High performance gas separation membranes", paper presented at Am. Inst. Chem. Engrs. 1984 Winter National Meeting, Atlanta, Ga., March 11-14, 1984).

To achieve high permeabilities it is essential that the separating layer of the membranes be kept as small as possible, because the gas flow is inversely proportional to the membrane thickness. Accordingly, a number of methods have been developed for producing a membrane which is as thin as possible. The manufacture of homogeneous, symmetric polymer films is simple to achieve: A thin polymer solution is applied to a suitable support by pour-coating or film-drawing. After evaporation of the solvent (which may be readily or difficultly volatizable), a film of polymer forms on the support. However, homogeneous, symmetrical membranes with film thickness $\leq 5$ micron are difficult to handle, and usually have defects which limit their application in gas separations. Membranes fabricated from glass-like polymers must have film thickness $\leq 1$ micron in order to achieve economical permeabilities (at least 0.05 cu m per sq m per hr per bar). It is possible to manufacture homogeneous, symmetrical polymer films of this order of magnitude only with very costly techniques, because impurities which are present (e.g., dust particles) with sizes of 3000 Angstrom are unavoidable in membrane fabrication (for example, see U.S. Pat. No. 4,230,463). This particle size is adequate to initiate defect loci in the membrane, resulting in sharply lower separation performance (lower selectivity).

A currently prevalent method of manufacturing membranes is the phase inversion process, which leads to integral asymmetric membranes. An integral asymmetric membrane is comprised of a thin selective layer (about 0.2-1 micron) and a porous base layer, which base layer provides the membrane with strength and durability. Important advantages of this method are the relatively simple manufacturing technique and the possibility of fabricating membranes with different structures and therefore different separation characteristics.

The greatest difficulty with integral asymmetric membranes is the same as with homogeneous, symmetrical membranes—the problem of forming an absolutely defect-free, selective film. The only commercially employed integral asymmetric phase-inversion membrane which is usable for gas separation (because it has a defect-free, selective film) is a cellulose acetate membrane originally developed for sea water desalination (Envirogenics, Separex). Although the cellulose acetate membranes provide good separating characteristics, particularly for $CO_2/CH_4$ separation, their use for gas separation is characterized by the following drawbacks:

1. Sensitivity to condensed water (irreversible breakdown);
2. Sensitivity to microbiological attack;
3. Plastification of the cellulose acetate membranes, particularly during $CO_2$ separation;
4. Low heat resistance (up to about 70° C.); and
5. Relatively high manufacturing cost, because cellulose acetate membranes cannot be directly air-dried. (If direct air drying is employed, the porous base layer collapses.) A change of solvents is required in order to accomplish drying.

The enumerated drawbacks of cellulose acetate membranes tend to substantially detract from the separating characteristics. In view of these problems, there has been a great deal of research aimed at fabricating integral asymmetric membranes from other polymers. It is not possible to fabricate integral asymmetric membranes from any polymer with good material-specific properties. Thus, e.g., Kapton-brand polyimide film by E. I. duPont de Nemours & Co. should be usable in particular to separate $CO_2$ from $CH_4$ (Chern, R. T., Koros, W. J., Hopfenberg, H. B., Stannett, V. T., 1985, "Material selection for membrane-based gas separations", in "Material science of synthetic membranes", ACS Symposium Ser. Vol. 269, Ed. Douglas R. Lloyd, Amer. Chem. Soc., Wash., DC), due to polyimides's very high selectivity, very high heat resistance, and mechanioal strength and durability. Because polyimide is practically insoluble, however, phase inversion membranes cannot be produced from it using the usual techniques.

There are other suitable polymers from which gas separation membranes can be fabricated, namely polysulfones and soluble polyimides. These polymers are not commercially available, however. They have not been manufactured on a scale greater than laboratory scale, even though they have improved chemical resistance, heat resistance, and mechanical strength and durability, because they do not offer substantially better separation characteristics, particularly for $CO_2/CH_4$ separation. The separation characteristics of various integral asymmetric phase-inversion membranes are presented in Tables 1 and 2.

TABLE 1

Permeability of integral asymmetric phase-inversion membranes to various gases, for gas separations at 22° C.:

| Gas | Cellulose acetate ($m^3/m^2hbar$) | Polysulfone** ($m^3/m^2hbar$) | Polyimide ($m^3m^2hbar$) |
| --- | --- | --- | --- |
| He | 0.80 | 0.50 | 0.51 |
| $H_2$ | 0.64 | 0.39 | 0.27 |
| $CO_2$ | 0.23* | 0.20* | 0.05* |
| $CH_4$ | 0.0084 | 0.0080 | 0.0015 |
| $N_2$ | 0.0084 | 0.0053 | 0.0018 |

*Values interpolated from zero pressure.
**Product being developed by Envirogenics - not commercially available.

TABLE 2

Ideal selectivities of integral asymmetric phase-inversion membranes:

| Ideal Selectivity | Cellulose acetate | Polysulfone** | Polyimide |
| --- | --- | --- | --- |
| $\alpha^*CO_2/CH_4$ | 27 | 25 | 33 |
| $\alpha^*CO_2/N_2$ | 27 | 38 | 28 |
| $\alpha^*He/N_2$ | 95 | 94 | 284 |

$\alpha^*$ = Ideal selectivity.

Envirogenics has stated that as of March 1984 there was no commercially available plastic which achieved an ideal selectivity of 40 for the $CO_2/CH_4$ separation and was suitable for producing integral asymmetric membranes.

An unfilled need of the prior art is to manufacture an integral asymmetric membrane for gas separation which is particularly suitable for $CO_2/CH_4$ separation, which membrane has improved insensitivity to water and relatively high strength and durability, as well as having high separation throughput and selectivity (permeability $\geq 0.1$ cu m/sq m/hr/bar for $CO_2$, and $CO_2/CH_4$ selectivity about 30–40), which high separation throughput and selectivity are necessary for economical separation of materials.

SUMMARY OF THE INVENTION

According to the invention, a polymer with, e.g., the plastic known as polyether sulfone ("PES"), may be employed, resulting in good selectivity for the separation of $CO_2/CH_4$ mixtures, and good selectivity for separation of relatively light gases such as helium and hydrogen from relatively heavy gases such as nitrogen, methane, and carbon monoxide.

The invention will be described in more detail hereinbelow, with reference to exemplary embodiments and to Tables 3–9 as well as FIGS. 1 and 2.

DETAILED DESCRIPTION OF THE INVENTION

Surprisingly it has been discovered, in connection with the invention, that an integral asymmetric membrane with a nearly defect-free skin (about 0.1–0.3 micron) can be fabricated by preparing a solution of polyether sulfone (PES) in a solvent system comprising a volatile, strong solvent and a less volatile solvent which is a weaker solvent for the polymer, and further comprising a non-solvent which acts as a pore-forming medium. The said solution can be applied by film-drawing to form a film of prescribed thickness, using ordinary techniques. After a specified exposure time to the air, a sufficient amount of the easily volatilized solvent is evaporated. The phase inversion which occurs is visible by a dulling or clouding of the membrane. The thus structured PES membrane is then precipitated in an organic liquid which is a non-solvent for PES, in order to fix the structure and to remove the remaining, difficultly volatilizable components of the solution. The moist membrane can then be dried in air and can be employed as a gas separation membrane with high selectivity and flux.

Figure 1:
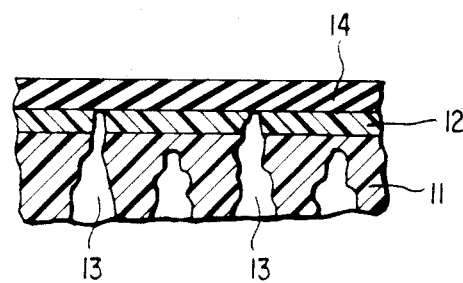
FIG. 1 illustrates a membrane made by a known coating method.

With the use of a known coating method (see FIG. 1), the selectivity can be further increased, with only a slight decrease in flux. In this connection, a silicone layer 14 about 1 micron thick is applied to the microporous support layer 11 bearing a selective membrane skin 12 of the same material and having through-penetrating defect loci 13. This coating method requires an additional manufacturing process step, however, because the coating of the membranes can only be carried out in a later step, in the dry state.

Figure 2:
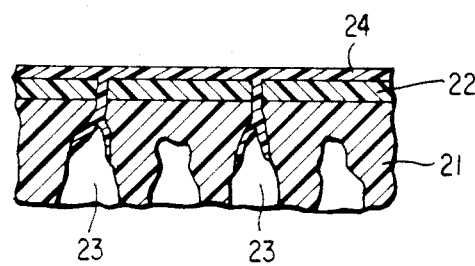
FIG. 2 illustrates a membrane made by an in situ coating method according to the invention.

Accordingly, in an extension of the inventive concept, this method was adapted for in situ coating according to FIG. 2. By adding a very low concentration of a polymer which is soluble in the precipitation bath, a situation can be created in which the small defect loci 23 present in the microporous support layer 21 and first membrane skin 22 are blocked by this added polymer which forms a layer 24 about 0.1 micron thick, wherewith the polymer penetrates into the defects 23 from the layer 24. With this method the selectivity of the integral asymmetric PES membrane can be increased. In comparison to the elastomer coating described in U.S. Pat. No. 4,230,463 (FIG. 1), the film thickness of the polymer coating 24 is much less and the pores 23 in membrane skin 22 are completely filled with polymer.

The inventive PES membranes are superior to the presently available commercial gas separation membranes for separating $CO_2/CH_4$ mixtures. The $CO_2$ permeability reaches the economic range. As seen in Examples 1 and 4, the membranes may also be used for separating hydrogen from nitrogen (or from carbon monoxide), and for separating helium from methane or nitrogen.

The following examples illustrate the process of the invention, and do not limit the scope of the invention of the claims.

The following are the definitions of the dimensionless parameters used in the Examples, which parameters are namely the ideal selectivity $\alpha^*$, the real selectivity $\alpha$, and the separation factor $\beta$.

The ideal selectivity $\alpha^*$ is determined with pure gases. With a membrane pressure difference $\Delta pi$, one determines the amount of a gas i which passes through the membrane per unit time. This quantity $Q_i$ is divided by the pressure difference $\Delta p_i$ and the membrane area F, giving the permeability $$p_i^{ideal} = \frac{Q_i}{F \cdot \Delta p_i}$$

The permeability of a second gas $p_i^{ideal}$ is similarly determined (at the same pressure difference, i.e. $p_i = p_j$
For the ideal selectivity, $$\alpha_j^* = \frac{p_i^{ideal}}{p_j^{ideal}}$$

The real selectivity $\alpha$ is determined with gas mixtures. The gas quantities $Q_i$ and $Q_j$ are calculated, representing the amounts of the respective gases passing through the membrane per unit time. The permeability $p_i^{real}$ is the gas quantity $Q_i$ divided by the membrane area and the partial pressure difference $\Delta p_i$ The real selectivity can be calculated as follows, by determining the permeability of the second gas $p_j^{real}$ $$\alpha_j^j = \frac{p_i^{real}}{p_j^{real}}$$

In the following Examples with gas mixtures, the tests were carried out with practically no removal [of material], i.e., there were only negligible differences between the composition of the feed and that of residual material.

The separation factor $\beta$ is defined as follows:

$$\beta_j^j = \frac{(p_i''/p_j'')}{(p_i'/p_j')}$$

where $p_i''$ and $p_j''$ are the partial pressures on the permeate side, and $p_i'$ and $p_j'$ and are the partial pressures on the high pressure side.

With a 2-component mixture, the following relation exists between the real selectivity and the separation factor:

$$\beta_j^j = \alpha_j^j \cdot \frac{1 - (p_i''/p_i')}{1 - (p_j''/p_j')}$$

The separation factor $\beta$ is thus a function of the membrane-specific quantity $\alpha$ and of the test-specific pressure ratio of the permeate pressure to the feed pressure.

The pour-coating solution according to the present invention is comprised of a polymer (PES), at least one solvent, and at least one non-solvent for PES.

The polymer:

To prepare integral asymmetric PES membranes, any commercially available PES with the following structure may be used:

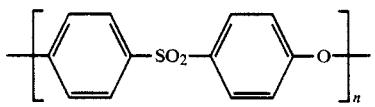

The commercially available types ("Victrex", manufactured by ICI, and "Ultrason E", manufactured by BASF) differ in form (powder or granulate), viscosity, and chemical resistance. Based on the number of types on the market, very different pour-coating solutions can be prepared, which differ particularly in their viscosity, despite having the same other components and concentrations. This affords an important advantage from the standpoint of process engineering, when manufacturing a variety of membrane forms (flat, tubular, or hollow-fiber membranes). The PES content of the pour-coating solution may be between about 8 and about 30 wt. %. Other structurally similar PESs which are soluble in the solvents described below may also be used.

The solvent system

Halogenated hydrocarbons are used as solvents, particularly dichloromethane and 1,1,2-trichloroethane. Solvent mixtures have proven to be particularly suitable, especially dichloromethane/1,1,2-trichloroethane, dichloromethane/chloroform, and dichloromethane/-chloroform/1,1,2-trichloroethane. Hereinafter the solvent with the lowest boiling point will be designated the "main solvent".

The non-solvent system

The pour-coating solution must contain at least one pore-forming material which is a non-solvent for PES. This non-solvent should have a boiling point which is at least 20° C. above that of the main solvent. The following may be used as non-solvents:
Carboxylic acids, particularly formic acid and acetic acid;
Aliphatic alcohols, particularly 1-propanol, 2-propanol, 1-butanol, and 2-butanol;
Cyclic alcohols, particularly cyclohexanol;
Alkylbenzenes, particularly xylene and toluene.

The content of non-solvents in the pour-coating solution may be between about 3 and about 25 wt. %. The concentration should be chosen as high as possible, because the thickness of the active layer decreases with increasing content of non-solvents. On the other hand, substantial variability of the kinetics of the phase-inversion process, and thus substantial variability of the structure of the membrane, is available by varying the concentration of the non-solvents.

Choice of the precipitating agent

Any and all organic liquids which are non-solvents for PES may be used as membrane precipitating agents. The precipitating agent must be completely miscible with all liquid components of the pour-coating solution. The boiling point of the precipitating agent should be as low as possible, in order to facilitate the drying of the finished fabricated membranes. Methanol has proven to be a particularly suitable precipitation agent.

The separation characteristics of the PES membranes precipitated in methanol may be improved by employing an additive in the precipitation bath. Any and all methanolsoluble polymers may be used as additives. The precipitation kinetics for the PES membranes should not be substantially detrimentally affected by the additive. The moist membranes can be dried in air. After an appropriate drying time, a thin film of the additive forms on both surfaces of the membrane. Defect loci in the PES membranes are covered and closed off with the aid of said film. In order not to excessively reduce the permeability to the more rapid permeable gases, the concentration of the additive in the precipitation bath must be low. The concentration of additive in the precipitation will vary, depending on the type of the additive. In contrast to methods with silicone coating, the defect loci are blocked in a single process step. Any and all methanol-soluble polymers may be used as additives, particularly ethylcellulose, cellulose acetate/propionate, and cellulose acetate/butyrate.

EXAMPLE 1

| | |
|---|---|
| PES ("Victrex 5200 G" or "Ultrason E 3000") | 14.4 wt. % |
| Dichloromethane | 47.9 wt. % |
| 1,1,2-trichloroethane | 24.0 wt. % |
| Formic acid | 6.0 wt. % |
| 2-Butanol | 7.7 wt. %. |

The solution was filtered with the aid of a high pressure cell, and then was allowed to stand about 1 hr to remove air bubbles, and the clear pour-coating solution was applied at 20° C. to glass plates by film-drawing from a drawing carriage, to form a film 250–300 micron thick. After a short evaporation time (about 5–10 sec) and development of appreciable turbidity in the film, the resulting moist membrane was immersed in a methanol bath at about 16° C. The membrane was then dried at room temperature.

Some of the membranes were tested for permeability with the pure gases helium, carbon dioxide, and nitrogen, at 5 bar, and the remainder of the membranes were welded to membrane pads (each bearing two membranes with their selective layers outermost). The membrane pads were immersed in a silicone solution thinned with petroleum ether. After evaporation of the petroleum ether, a thin silicone layer formed on the selective skin. The crosslinking time of the silicone was about 1 day. Then the pads were cut apart and tests were conducted for selectivity for the abovementioned gases. The results of the measurements are given in Table 3.

| | Permeabilities (cu m/sq m/hr/bar) | | | Selectivities [(ideal)] | |
|---|---|---|---|---|---|
| | | | | He $\alpha^*$ | $CO_2$ $\alpha^*$ |
| | He | $CO_2$ | $N_2$ | $N_2$ | $N_2$ |
| PES membranes, uncoated | 0.295 | 0.196 | 0.00482 | 61 | 41 |
| PES membranes, with silicone | 0.270 | 0.170 | 0.00265 | 102 | 64 |

The results from Table 3 show that silicon coating enables a substantial increase in selectivity.

The silicon-coated membranes were also tested with $CO_2/CH_4$ mixtures, at 5 bar and 20° C. (membrane area 0.00342 sq. m). The results are given in Table 4.

| | Pressure (bar) | Volumetric flow rate (cu m/hr) | Concentration | |
|---|---|---|---|---|
| | | | (% $CO_2$) | (% $CH_4$) |
| Feed | 6 | 0.0261 | 52,54 | 47.46 |
| Retentate | 6 | 0.0254 | 51.37 | 48.63 |
| Permeate | 1 | 0.0008 | 97.28 | 2.72 |

| | Permeability (cu m/sq m/hr/bar) | Selectivity | Separation factor |
|---|---|---|---|
| $CO_2$ | 0.10378 | $\alpha CO_2/CH_4 = 47.6$ | $\beta CO_2/CH_4 = 33.1$ |
| $CH_4$ | 0.00218 | | |

The following Examples will illustrate the important influence of the individual components of the pour-coating solution.

EXAMPLE 2

| | | |
|---|---|---|
| Solution A: | PES ("Ultrason E 3000") | 14.3 wt. % |
| | Dichloromethane | 71.4 wt. % |
| | Formic acid | 7.1 wt. % |
| | 1-Butanol | 7.2 wt. % |
| | Precipitation via methanol. | |
| Solution B: | PES ("Ultrason E 3000") | 14.4 wt. % |
| | Dichloromethane | 47.9 wt. % |
| | 1,1,2-Trichloroethane | 24.0 wt. % |
| | Formic acid | 6.0 wt. % |
| | Ethanol | 7.7 wt. % |
| | Precipitation via methanol. | |
| Solution C: | PES ("Ultrason E 3000") | 14.4 wt. % |
| | Dichloromethane | 47.9 wt. % |
| | 1,1,2-Trichloroethane | 24.0 wt. % |
| | Formic acid | 6.0 wt. % |
| | 1-Butanol | 7.7 wt. % |
| | Precipitation via methanol. | |

All the membranes were coated with silicone and tested as in Example 1 (5 bar, 20° C.). Table 5 gives the results.

| Solution | Permeability to $CO_2$ (cu m/sq m/hr/bar) | Selectivity [(ideal)] $CO_2$ $\alpha^*$ $N_2$ |
|---|---|---|
| A | 0.026 | 59 |
| B | 0.076 | 40 |
| C | 0.196 | 65 |

Comparison of the data from solutions A and C shows the major influence of a second, "secondary" solvent having boiling point greater than that of the main solvent. The addition of a secondary solvent enables substantial increases in the permeabilities to the more rapid permeable, gases while retaining the same selectivities.

In comparison to solution C, solution B employs a different non-solvent but the same other components and concentrations, in the pour-coating solution. Both the selectivity and the permeability are much lower.

In Example 1, the effect of silicone coating is illustrated—namely, improved selectivity with only slight decrease in permeability. However, the results with the uncoated PES membranes of Example 1, compared with the silicone-coated membranes of Example 2 (solution B), indicate that the most important factor in the separation characteristics of a PES gas separation membrane is the choice of a suitable pour-coating solution. Thus, silicone coating is particularly practicable for membranes which already have good separating characteristics in the uncoated state.

EXAMPLE 3

The pour-coating solution was as in Example 1.
Precipitation bath: 2.5 g/liter cellulose acetate/propionate.

The separation characteristics of the resulting membranes are seen from Table 6 (measurement conditions 5 bar and 20° C.).

TABLE 6

| Permeabilities (cu m/sq m/hr/bar) | | Selectivities [(ideal)] | |
|---|---|---|---|
| He | 0.2810 | $\alpha^* \dfrac{He}{N_2}$ | = 117 |
| $CO_2$ | 0.1360 | $\alpha^* \dfrac{CO_2}{N_2}$ | = 57 |
| $N_2$ | 0.0024 | | |

In a single-stage permeation, the separating characteristics were studied for gas mixtures at 5 bar and 20° C. The results are given in Table 7.

TABLE 7

| | Pressure (bar) | Volumetric flow rate (cu m/hr) | Concentration (% $CO_2$) | (% $CH_4$) |
|---|---|---|---|---|
| Feed | 6 | 0.0370 | 48.85 | 51.15 |
| Retentate | 6 | 0.0357 | 47.32 | 52.68 |
| Permeate | 1 | 0.0013 | 95.84 | 4.160 |

| | Permeability (cu m/sq m/hr/bar) | Selectivity | Separation factor |
|---|---|---|---|
| $CO_2$ | 0.1951 | $\alpha CO_2/CH_4 = 36.7$ | $\beta CO_2/CH_4 = 24.9$ |
| $CH_4$ | 0.0053 | | |

EXAMPLE 4

A PES with relatively low viscosity was employed. The precipitation bath comprised a 0.4% solution of ethylcellulose ("Ethocel Med. 50", Dow Chemical) in methanol. The membranes were precipitated at 18° C.

| Formula of the pour-coating solution: | |
|---|---|
| PES ("Victrex 4800 P") | 14.4 wt. % |
| Dichloromethane | 47.8 wt. % |
| 1,1,2-Trichloroethane | 23.9 wt. % |
| Formic acid | 6.0 wt. % |
| 1-Butanol | 7.9 wt. %. |

Table 8 indicates the separation characteristics of the membranes. (Measurement conditions were 3.5 bar and 20° C.)

TABLE 8

| Gas | Permeability (cu m/sq m/hr/bar) | Selectivity | |
|---|---|---|---|
| $H_2$ | 0.4030 | $\alpha^* \dfrac{H_2}{CH_4}$ | = 90 |
| $CO_2$ | 0.2650 | $\alpha^* \dfrac{CO_2}{CH_4}$ | = 59 |
| $CH_4$ | 0.0045 | | |
| $N_2$ | 0.0045 | | |

In order to obtain the best quality membranes it is important to use pour-coating solutions which are as fresh as possible. Due to the crystallization states which PES adopts, the polymer precipitates out after a brief time. Membranes were applied by film-drawing of a 24-hr-old pour-coating solution (which was shortly before precipitation of the PES). The precipitation bath again comprised a 0.4 weight % solution of ethylcellulose in methanol. The membranes still had high selectivity (128 for $CO_2/CH_4$), but the permeability to $CO_2$ was only 0.023 cu m/sq m/hr/bar.

EXAMPLE 5

This Example demonstrates that the permeability to $CO_2$ can be increased, at the cost of the selectivity, if the proportion of 1,1,2-trichloroethane in the pour-coating solution is increased. The precipitation bath comprised a 0.4 weight % solution of ethylcellulose ("Ethocel Standard 100", Dow Chemical) in methanol. The membranes were precipitated at 18° C.

| Formula of the pour-coating solution: | |
|---|---|
| PES ("Victrex 4800 P") | 14.4 wt. % |
| Dichloromethane | 35.9 wt. % |
| 1,1,2-Trichloroethane | 35.9 wt. % |
| Formic acid | 6.0 wt. % |
| 1-Butanol | 7.8 wt. %. |

Table 9 indicates the separating characteristics of the membranes. (Measurement conditions were 3.5 bar and 20° C.)

TABLE 9

| Gas | Permeability (cu m/sq m/hr/bar) | Selectivity [(ideal)] |
|---|---|---|
| $N_2$ | 0.007 | $\alpha^* CO_2/CH_4 = 43$ |
| $CH_4$ | 0.007 | |
| $CO_2$ | 0.302 | |

If the membranes are precipitated in pure methanol, the result is membranes with a $CO_2/CH_4$ selectivity of only 7.

The present disclosure relates to the subject matter disclosed in our patent application in the Federal Republic of Germany, Ser. No. P 35 25 235.9 filed on July 15, 1985, the entire specification of which is incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An integral asymmetric membrane for separating gases, manufactured by
   mixing a membrane-former, a halogenated hydrocarbon solvent, and a pore-forming agent which is not a solvent for said membrane-former to form a mixture,
   casting said mixture to form a film, and
   contacting said film with an organic precipitation agent to form a membrane.

2. The membrane set forth in claim 1, wherein said membrane-former is polyether sulfone.

3. The membrane set forth in claim 1, wherein said precipitation agent is methanol.

4. A method of manufacturing an integral asymmetric membrane for separating gases from each other, comprising steps for:
   mixing a membrane-former, a halogenated hydrocarbon solvent, and a pore forming agent which is not a solvent for said membrane-former to form a mixture, casting said mixture to form a film, and contacting said film with an organic precipitation agent to form a membrane.

5. The method set forth in claim 4, wherein said membrane-former is polyether sulfone.

6. The method set forth in claim 5 including drying said membrane in air or in an inert gas.

7. The method set forth in claim 5 including coating said membrane with an elastomer.

8. The method set forth in claim 5, wherein said solvent is selected from the group consisting of dichloromethane, 1,1,2-trichloroethane, chloroform, and mixtures thereof.

9. The method set forth in claim 5, wherein said precipitation agent is methanol.

10. The method set forth in claim 5, wherein said solvent is a halogenated hydrocarbon of one to three carbons.

11. The method set forth in claim 10, wherein said agent which is not a solvent for said membrane-former contains an aliphatic alcohol of two to eight carbons.

12. The method set forth in claim 11, wherein said agent which is not a solvent for said membrane-former contains an aliphatic carboxylic acid of one to four carbons or an alkylbenzene of seven to ten carbons.

13. The method set forth in claim 11, wherein said agent which is not a solvent for said membrane-former is selected from the group consisting of 1-propanol, 2-propanol, 1-butanol, 2-butanol, and cyclohexanol.

14. The method set forth in claim 12, wherein said agent which is not a solvent for said membrane-former is selected from the group consisting of formic acid, acetic acid, toluene, and xylene.

15. The method set forth in claim 13, wherein said agent which is not a solvent for said membrane-former comprises between about 3 wt. % and about 25 wt. % of said mixture.

16. The method set forth in claim 14, wherein said agent which is not a solvent for said membrane-former comprises between about 3 wt. % and about 25 wt. % of said mixture.

17. A method of manufacturing an integral asymmetric membrane for separating gases from each other, comprising steps for:

mixing a membrane-former, a halogenated hydrocarbon solvent, and a pore-forming agent which is not a solvent for said membrane-former to form a mixture, casting said mixture to form a film, contacting said film with an organic precipitation agent comprising methanol and an additive selected from the group consisting of ethylcellulose, cellulose acetate/propionate, cellulose acetate/butyrate, and mixtures thereof to form a membrane.

18. The method set forth in claim 17, wherein said membrane-former is polyether sulfone.

19. The method set forth in claim 17, including drying said membrane in air or in an inert gas.

20. The method set forth in claim 17, including coating said membrane with an elastomer.

* * * * *